United States Patent
Feldheim et al.

(10) Patent No.: US 6,888,665 B2
(45) Date of Patent: May 3, 2005

(54) ELECTRONIC DEVICES AND METHODS USING MOLECULARY-BRIDGED METAL NANOPARTICLES

(75) Inventors: Daniel Feldheim, Cary, NC (US); Louis C. Brousseau, III, Austin, TX (US); James P. Novak, Alexandria, VA (US)

(73) Assignee: North Carolina State University, Raleigh, NC (US)

( * ) Notice: Subject to any disclaimer, the term of this patent is extended or adjusted under 35 U.S.C. 154(b) by 221 days.

(21) Appl. No.: 10/216,059

(22) Filed: Aug. 9, 2002

(65) Prior Publication Data

US 2003/0067668 A1 Apr. 10, 2003

Related U.S. Application Data

(60) Provisional application No. 60/311,191, filed on Aug. 9, 2001.

(51) Int. Cl.[7] ............................. G02F 1/37; H01L 51/10

(52) U.S. Cl. ............................. 359/328; 257/E21.404; 257/E29.322; 257/E51.023; 977/DIG. 1

(58) Field of Search ................................. 359/326, 328; 257/E21.404, E29.322, E51.023; 435/6, 7.1; 436/518, 525; 385/326, 328

(56) References Cited

U.S. PATENT DOCUMENTS

| | | |
|---|---|---|
| 6,586,787 B1 | 7/2003 | Shih et al. |
| 2002/0114987 A1 * | 8/2002 | Oscarsson et al. ............ 429/33 |
| 2002/0146742 A1 | 10/2002 | Wybourne et al. |
| 2003/0077625 A1 * | 4/2003 | Hutchison ...................... 435/6 |

OTHER PUBLICATIONS

Feldheim, *Assembly of Metal Nanoparticle Arrays Using Molecular Bridges*, The Electrochemical Society Interface, Fall 2001, pp. 22–25.

Mirkin, *Programming the Assembly of Two– and Three–Dimensional Architectures with DNA and Nanoscale Inorganic Building Blocks*, Inorg. Chem, vol. 39, 2000, pp. 2258–2272.

Novak et al., *Nonlinear Optical Properties of Molecculary Bridged Gold Nanoparticle Arrays*, J. Am. Chem. Soc., vol. 122, 2000, pp. 12029–12030.

Novak et al., *Assembly of Phenylacetylene–Bridged Silver and Gold Nanoparticle Arrays*, J. Am. Chem Soc., vol. 122, 2000, pp. 3979–3980.

Galletto et al., *Size Dependence of the Surface Plasmon Enhanced Second Harmonic Response of Gold Colloids: Towards a New Calibration Method*, Chem. Commun., 1999, pp. 581–582.

Galletto et al., *Enhancement of the Second Harmonic Response by Adsorbates on Gold Colloids: The Effect of Aggregation*, J. Phys. Chem. B., vol. 103, 1999, pp. 8706–8710.

(Continued)

*Primary Examiner*—John D. Lee
(74) *Attorney, Agent, or Firm*—Myers Bigel Sibley & Sajovec

(57) ABSTRACT

A molecule is wired into an electronic circuit by attaching a metal nanoparticle to the molecule and then electrically connecting a metal nanoparticle to the electric circuit. The metal nanoparticle interconnects can bridge the gap between small molecules and conventional electric circuits. An optical second harmonic also may be generated by impinging optical radiation having a first frequency on an array of molecularly bridged metal nanoparticles, to generate optical energy at a second frequency that is twice the first frequency. Red to blue light conversion thereby may be provided.

28 Claims, 13 Drawing Sheets

OTHER PUBLICATIONS

Brousseau, III et al., *Assembly of Phenylacetylene–Bridged Gold Nanocluster Dimers and Trimers*, Advanced Materials, Vo. 11, No. 6, 1999, pp. 447–449.

Brousseau, III et al., *pH–Gated Single–Electron Tunneling in Chemically Modified Gold Nanoclusters*, J. Am. Chem. Soc. vol. 120, 1998, pp. 7645–7646.

Feldheim et al., *Self–Assembly of Single Electron Transistors and Related Devices*, Chemical Society Reviews, vol. 27, 1998, pp. 1–12.

Antoine et al., *Surface Plasmon Enhanced Non–Linear Optical Response of Gold Nanoparticles at the Air/Toluene Interface*, Chem. Commun., 1997, pp. 1901–1902.

Mirkin et al., *A DNA–Based Method for Rationally Assembling Nanoparticles Into Macroscopic Materials*, Nature, vol. 382, Aug. 15, 1996, pp. 607–609.

Johnson et al., *Nonlinear Surface–Enhanced Spectroscopy of Silver Colloids and Pyridine: Hyper–Raman and Second–Harmonic Scattering*, The Journal of Physical Chemistry, vol. 93, No. 21, Oct. 19, 1989, pp. 7281–7285.

Agarwal et al, *Theory of Second Harmonic Generation at a Metal Surface With Surface Plasmon Excitation*, Solid State Communications, vol. 41, No. 6, 1982, pp. 499–501.

* cited by examiner

ELECTRONIC DEVICES AND METHODS USING MOLECULARY-BRIDGED METAL NANOPARTICLES

CROSS-REFERENCE TO PROVISIONAL APPLICATION

This application claims the benefit of provisional Application Ser. No. 60/311,191, filed Aug. 9, 2001, entitled Assembly of Metal Nanoparticle Arrays Using Molecular Bridges, the disclosure of which is hereby incorporated herein by reference in its entirety as if set forth fully herein.

FEDERALLY SPONSORED RESEARCH

This invention was made with Government support under National Science Foundation Contract No. CHE-971163. The Government may have certain rights to this invention.

FIELD OF THE INVENTION

This invention relates to electronic systems and fabrication methods therefor, and more particularly to nanoelectronic systems and fabrication methods therefor.

BACKGROUND OF THE INVENTION

Molecular devices and methods, also referred to as nanoscale devices and methods, or simply as nano-devices and nano-methods, are being widely investigated for present and future generations of electronic devices. Nanoscale devices and methods may employ one or more nanoparticles that are less than about 20 nm in size and, in some embodiments, less than or about 10 nm in size. These nanoparticle-based systems may provide higher integration density than may be available using current microelectronic technology. Moreover, because of their size, nanoscale devices and methods may provide devices and/or methods that have different functionality from conventional microelectronic devices and/or methods. Thus, for example, single electron transistors have been widely investigated for high density and/or high performance microelectronic devices. As is well known to those having skill in the art, single electron transistors use single electron nanoelectronics that can operate based on the flow of single electrons through nanometer-sized particles, also referred to as nanoparticles. In a single electron transistor, transfer of electrons may take place based on the tunneling of single electrons through the nanoparticles. Single electron transistors are described in articles by Brousseau, III et al., entitled *pH-Gated Single-Electron Tunneling in Chemically Modified Gold Nanoclusters*, Journal of the American Chemical Society, Vol. 120, No. 30, 1998, pp. 7645–7646, and by Feldheim et al., entitled *Self-Assembly of Single Electron Transistors and Related Devices*, Chemical Society Reviews, Vol. 27, 1998, pp. 1–12.

Another major avenue of investigation in nanotechnology is the assembly of nanoparticles into arrays. See the article by Brousseau, III et al., entitled *Assembly of Phenylacetylene-Bridged Gold Nanocluster Dimers and Trimers,* Advanced Materials, Vol. 11, No. 6, 1999, pp. 447–449, the disclosure of which is hereby incorporated herein by reference in its entirety as if set forth fully herein. Also see the article by Novak et al., entitled *Assembly of Phenylacetylene-Bridged Silver and Gold Nanoparticle Arrays,* Journal of the American Chemical Society, Vol. 122, No. 16, 2000, pp. 3979–3980, the disclosure of which is hereby incorporated herein by reference in its entirety as if set forth fully herein.

As described in the Brousseau, III et al. Advanced Materials article, studies of inorganic clusters continue to reveal fundamental information regarding the size, shape and medium-dependent optical and electronic behaviors of nanoscopic materials. Much of this research has involved characterization of the collective properties of disordered and crystalline two-dimensional (2D) and three-dimensional (3D) arrangements of clusters. Optical absorptions and electron hopping in these crystals of clusters have proven to be strongly dependent on the distance and medium between clusters. These observations have generated interest in nanoclusters on several more applied fronts; e.g., gold cluster chemiresistive sensors and deoxyribonucleic acid assay methods have been reported recently.

As also noted in the Brousseau, III et al. Advanced Materials article, the fundamental and applied advances described above vis-a-vis extended cluster networks prompted examination of the properties of more discrete assemblies of nanoclusters (e.g., dimers, trimers, etc.) so that the effects of local symmetry on collective particle properties could be better assessed. The assembly of phenylacetylene-bridged gold nanoparticle dimers and trimers from solution is reported. Phenylacetylene oligomers I and II (PA I, II) were chosen as basic linker repeat units because: 1) they are conformationally rigid molecules which could be expected to keep coupled nanoparticles at a fixed distance, an important difference from the DNA-linked systems reported previously; 2) they can be coupled to form a variety of geometries (e.g., linear, bent, trigonal planar, tetrahedral); 3) lengths of up to 16 repeat units (ca. 20 nm) are readily synthesized without significant solubility problems; and 4) they have been discussed as potential wire candidates for molecular electronic devices. Given these advantages, the Brousseau, III et al. Advanced Materials article indicated that the successful synthesis of PA-bridged gold nanoparticles would allow particle array symmetry-optical property relationships to be established. Indeed, initial optical studies reported therein found, in accord with theoretical predictions, that array symmetry does influence optical properties.

SUMMARY OF THE INVENTION

Some embodiments of the present invention provide methods for wiring a molecule into an electric circuit by attaching a metal nanoparticle to the molecule and then electrically connecting a metal nanoparticle to the electric circuit. In some embodiments, the molecule is about 10 nm wide, and the metal nanoparticle is about 20 nm in diameter. It has been found, according to these embodiments of the present invention, that the metal nanoparticle interconnects can bridge the gap between small molecules and conventional electric circuits, for example in an integrated circuit device.

In some embodiments, a metal nanoparticle is attached to the molecule by bonding (e.g., covalently bonding) the nanoparticle to the molecule through a thiol functionality. In some embodiments, the metal nanoparticle is electrically connected to the electric circuit by applying a voltage to a contact in the electric circuit, to thereby attract the metal nanoparticle to the contact. In other embodiments, a plurality of second metal nanoparticles are attached to the first metal nanoparticle, and at least some of the second metal nanoparticles are attached to the electric circuit. In still other embodiments, metal is deposited on the metal nanoparticle, and the metal is attached to the electric circuit.

In yet other embodiments, two metal nanoparticles may be attached to spaced apart portions of the molecule, and a respective one of the two metal nanoparticles is connected to a respective one of two spaced-apart portions of the electric circuit. This can create nanoparticle wires for electric circuits in some embodiments. In still other embodiments, three metal nanoparticles are attached to spaced apart portions of the molecule and a respective one of the three metal nanoparticles is connected to a respective one of three spaced-apart portions of the electric circuit. These three terminal devices may provide nanotransistors in some embodiments. Four or more terminal devices also may be provided.

Nanocircuits according to some embodiments of the invention include a nanomolecule (i.e., a molecule used in a nanocircuit), an electric circuit and at least one metal nanoparticle that electrically connects the nanomolecule to the electric circuit. Two or three metal nanoparticles may be employed, as was described above. Moreover, the nanomolecule may comprise a thiol-functionalized phenylacetelene molecule as was described above.

Other embodiments of the present invention provide methods of generating an optical second harmonic by impinging optical radiation having a first frequency on an array (i.e., an assembly) of molecularly-bridged metal nanoparticles, to generate optical energy at a second frequency that is twice the first frequency. In some embodiments, the optical radiation may be provided by a laser. In other embodiments, the first frequency corresponds to red light and the second frequency corresponds to blue light. In yet other embodiments, the array of molecularly-bridged metal nanoparticles comprises an array of metal nanoparticles that are bridged by thiol-functionalized phenylacetelene molecules. In still other embodiments, the metal nanoparticles are gold and/or silver nanoparticles. In yet other embodiments, the metal nanoparticles are bridged by non-centrosymmetric molecules such as trigonal and/or tetrahedral molecules. The array of molecularly-bridged metal nanoparticles may be in a solution and/or in a solid crystalline form.

Optical second harmonic generators according to some embodiments of the invention comprise an array (i.e., an assembly) of molecularly bridged metal nanoparticles that is responsive to optical radiation at a first frequency, to produce optical radiation at a second frequency that is about twice the first frequency. In other embodiments, an optical radiation source of the first frequency is provided, which is configured to impinge optical radiation on the array of molecularly-bridged metal nanoparticles, such that the optical radiation at the second frequency that is twice the first frequency emerges from the array of molecularly-bridged metal nanoparticles. The optical radiation source may be laser, the first frequency may correspond to red light, the second frequency may correspond to blue light, and the array of molecularly-bridged metal nanoparticles may comprise an array of metal nanoparticles that are bridged by thiol-functionalized phenylacetelene molecules and/or non-centrosymmetric trimers, as was described above.

Accordingly, arrays of molecularly-bridged nanoparticles may be used in electronic devices and/or methods. It will be understood that, although thiol-functionalized phenylacetelene molecules are described extensively herein as an example, many other classes of molecules such as organic, organometallic and/or inorganic complexes also may be used. In some examples, organic molecules can include any phenylenevinylene and any conjugated alkene such as beta-carotene. Moreover, inorganic complexes can include transition metal complexes, such as complexes with metal centers of iron, ruthenium, cobalt, nickel, copper, zinc and manganese ions, coordinated with two ligands, such as pyridine, bipyridine, terpyridine, phenanthroline and/or other such ligands.

DETAILED DESCRIPTION OF THE PREFERRED EMBODIMENT

Figure 1:
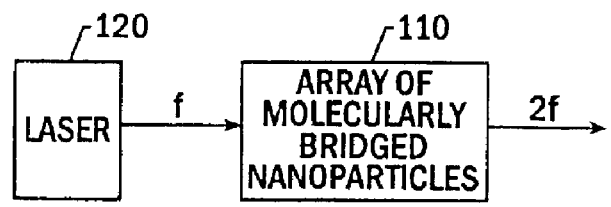
FIG. 1 is a block diagram of optical second harmonic generators and methods according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a block diagram of optical second harmonic generators and methods of generating an optical second harmonic according to some embodiments of the present invention. As shown in FIG. 1, optical radiation having a first frequency f, is impinged on an array or assembly of molecularly-bridged metal nanoparticles 110, to generate optical radiation at a second frequency 2f that is twice the first frequency. The array of molecularly-bridged nanoparticles 110 may be fabricated, for example, as was described in the above-cited Advanced Materials publication to Brousseau, III et al. In some embodiments, the array of molecularly-bridged nanoparticles 110 comprises an array of metal nanoparticles that are bridged by thiol-functionalized phenylacetelene molecules. In other embodiments, the array of molecularly-bridged nanoparticles 110 comprises an array of gold and/or silver nanoparticles that are bridged by thiol-functionalized phenylacetelene molecules. In still other embodiments, the array of molecularly-bridge metal nanoparticles comprises an array of metal nanoparticles that are bridged by non-centrosymmetric trimers. In some embodiments, the array of molecularly-bridged nanoparticles 110 is in solution (e.g., a membrane). In other embodiments, the array of molecularly-bridged metal nanoparticles 110 is in a solid crystalline form. In still other embodiments, the molecular bridge is about 10 nm wide and the metal nanoparticles are about 20 nm in diameter. The array or assembly need not have a repeating pattern of unit cells throughout.

Still referring to FIG. 1, an optical radiation source such as a laser 120 may be used to impinge optical radiation on the array of molecularly-bridged nanoparticles 110. In some embodiments, the laser 120 is a conventional red laser, so that the first frequency f corresponds to red light. For example, f may correspond to a wavelength of about 800 nm. By impinging the red light onto the array of molecularly-bridged nanoparticles 110, a blue light second harmonic may be generated, such that 2f may correspond to a wavelength of about 400 nm.

In some embodiments, the array of molecularly-bridged nanoparticles 110 is spaced apart from the laser 120. In other embodiments, the array of molecularly bridged nanoparticles 110 is on the laser 120. In still other embodiments, the array of molecularly bridged nanoparticles 110 is directly on the laser 120.

Additional discussion of nonlinear optical properties of molecularly-bridged gold nanoparticle arrays that can be used in some embodiments of the invention now will be provided. This discussion is based on an article by coinventor Novak et al., entitled *Nonlinear Optical Properties of Molecularly Bridged Gold Nanoparticle Arrays,* Journal of the American Chemical Society, Vol. 112, No. 48, published on the Web Nov. 16, 2000, pp. 12029–13030, the disclosure of which is hereby incorporated herein by reference in its entirety as if set forth fully herein. In particular, metal nanoparticles that are assembled into symmetrically and spatially well-defined architectures may allow new properties to emerge from the particle aggregate that are distinctly different from the corresponding isolated nanoparticles. For example, collective nanoparticle behaviors are responsible for large surface-enhanced Raman signals and first hyperpolarizabilities and the familiar red-blue color change currently being exploited in a number of calorimetric assays. See Mirkin et al., Nature, Vol. 382, 1996, p. 607, and Mirkin, Inorganic Chemistry, Vol. 39, 2000, pp. 2258. The success of many emerging nanoscale electronics technologies (e.g., single electron devices, quantum cellular automata) also may depend largely on the ability to organize nanoparticles and optimize capacitive or dipole coupling in the resulting assembly.

Collective nanocluster behaviors have traditionally been assessed using extended 2- or 3-dimensional nanocluster arrays prepared by (i) salt-induced aggregation, (ii) Langmuir techniques, (iii) surface assembly, or (iv) crystallization. Vance and co-workers, for example, utilized hyper-Rayleigh scattering (HRS) to interrogate aqueous suspensions of 13 nm diameter gold particles. First hyperpolarizabilities ($\beta$) were found to surpass the best available molecular chromophores. Moreover, $\beta$, increased more than 10-fold upon the addition of salt, likely due to the formation of non-centrosymmetric particle aggregates. However, the fact that salt-induced aggregation may not lead to a preferred symmetry may preclude a detailed account of structure-optical function relationships.

Figure 5:
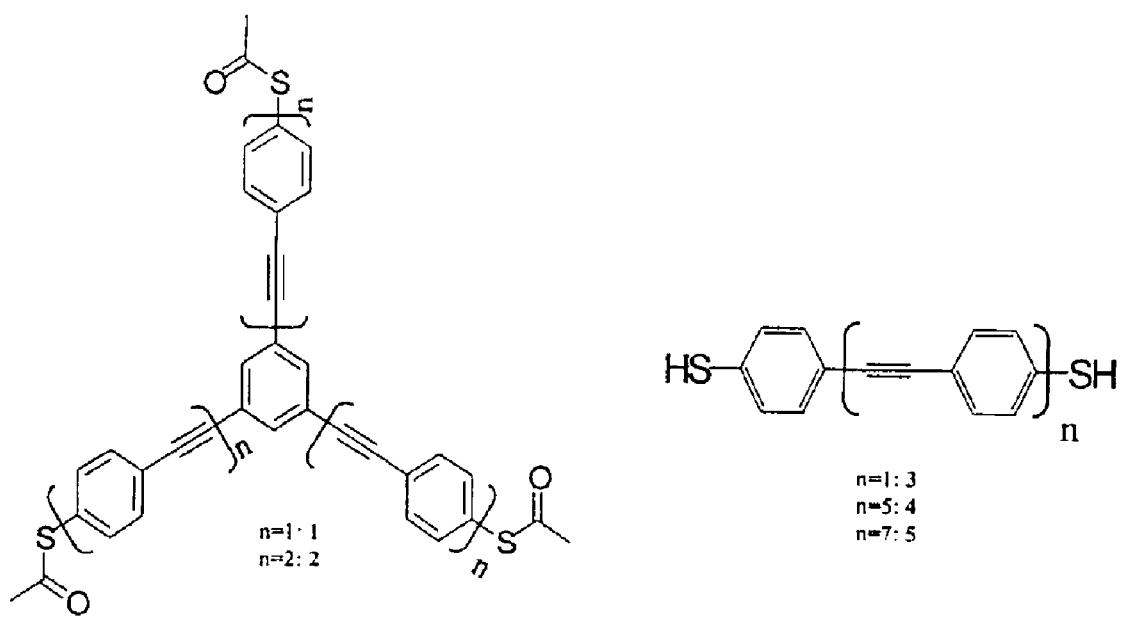
FIG. 5 illustrates molecular bridges that may be used in arrays of molecularly-bridged metal nanoparticles according to some embodiments of the present invention.

Methods for assembling gold and silver nanoparticle aggregates of well-defined symmetry and interparticle spacing have been described in the above-cited Brousseau, III et al. Advanced Materials article. As shown in FIG. 5, these protocols employ thiol-functionalized phenylacetylene (PA) "templates" 1–5 whose symmetries dictate the symmetry of the resulting aggregate. Addition of substoichiometric amounts of a desired template to a solution of particles has yielded discrete particle dimers, trimers, or tetramers, with pseudo D$\infty$h, D3h, Td, or D4h symmetries, depending on the chosen molecular bridge.

Recognition that for monodisperse spherical particles, a D3h symmetric trimer (trigonal) is the simplest non-centrosymmetric aggregate, prompted an investigation of HRS of PA-bridged gold nanoparticle arrays. The results (i) confirm earlier TEM evidence of lowered symmetry for the arrays, (ii) reveal large second-harmonic responses from non-centrosymmetric trimers relative to centrosymmetric monomers and dimers, and (iii) show, for trimers, decreases in $\beta$ with increasing interparticle distance.

HRS theory and instrumentation have been described previously. Briefly, HRS is incoherently scattered second harmonic light. For species in solution, it reports directly on $\beta$, without the need for electric-field alignment of the species. The described investigation employed the mechanically chopped output of a mode-locked Ti:sapphire laser (820 nm) as the incident light source. Nonlinear scattering was collected over a wide solid angle centered at 90°, passed through appropriate optical filters, and retrieved by lock-in amplification. Control experiments (detection monochromator successively set above, at, and below 2ω) established that the signals indeed were HRS, rather than two-photon-induced fluorescence responses.

Figure 6:
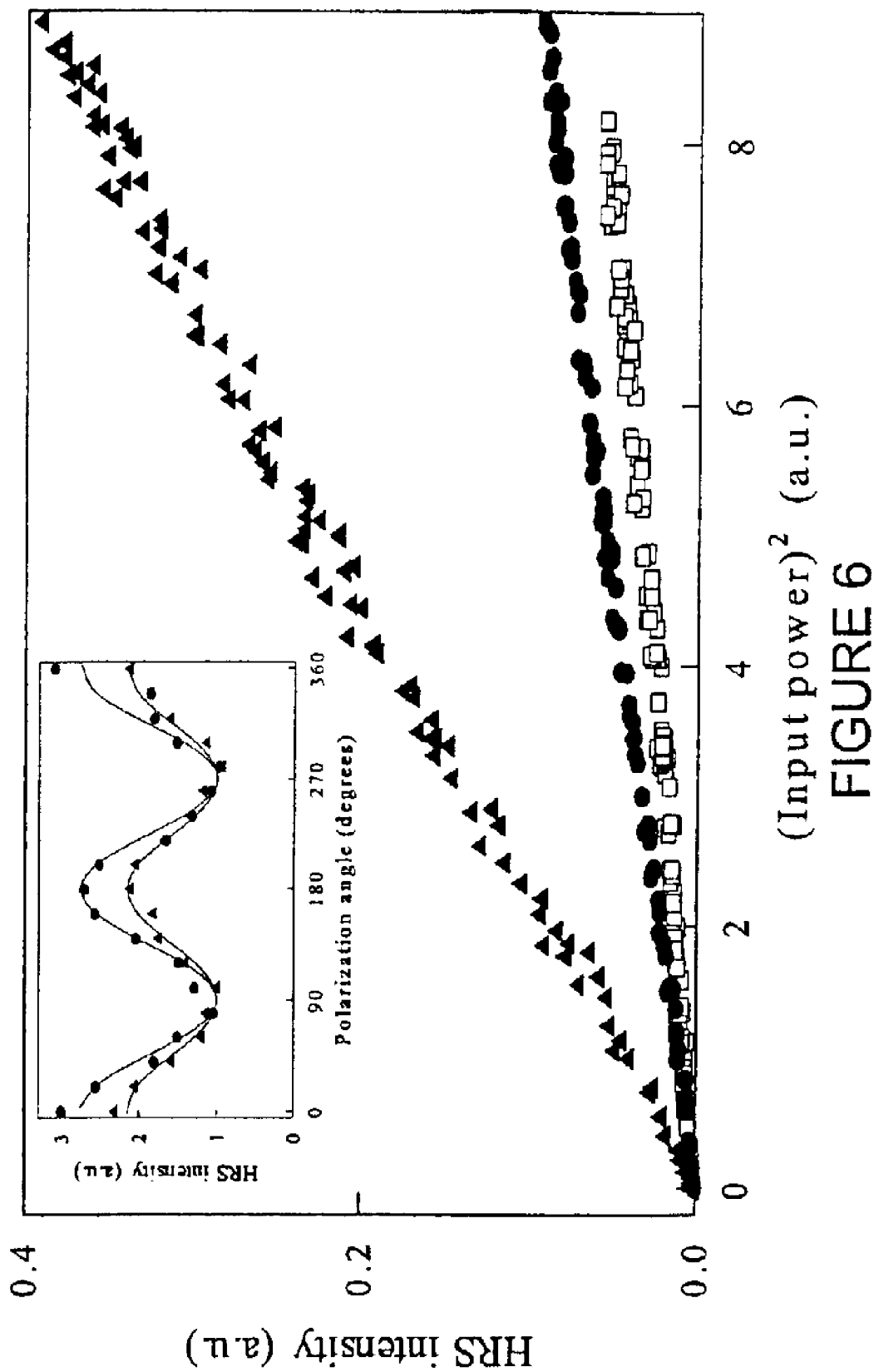
FIG. 6 graphically illustrates relative HRS intensity of an NM trimer 1 (▲), dimer 3 (□), and monomer (●), HRS depolarization for 5 nm monomer (top insert) and trimer 1 (bottom insert) according to some embodiments of the present invention.

Presented in Table 1 are HRS data for gold nanoparticle monomers, dimers, and trimers. Solutions of dimers and trimers may be contaminated with unreacted monomer; thus, the HRS data for these species are corrected using TEM-derived concentrations of each aggregate. While trimer formation clearly increases the nonlinear scattering intensity, I, it has an almost negligible effect on the linear extinction spectrum. In contrast, the formation of large aggregates is well-known to exert a substantial influence upon the extinction spectrum, inducing features in the red and near-infrared region. FIG. 6 shows HRS intensities as a function of the square of the input power for 8 nm diameter gold monomers, dimers, and trimers. The linear relationship in each plot is indicative of HRS rather than residual coherent second harmonic generation (SHG). Also shown in FIG. 6 are the comparatively high nonlinear scattering efficiencies, per component nanoparticle, for trimers versus monomers and dimers. Note that dimers, like spherical monomers, are centrosymmetric objects.

TABLE 1

| scatterer[a] | I[b] | β'/10$^{-30}$ esu | D[c] |
|---|---|---|---|
| 5 nm m | 1.0 | 680 ± 30 | 2.8 |
| 5 nm t1 | 4.9 | 1500 ± 210 | 2.2 |
| 5 nm t2 | 4.5 | 1450 ± 150 | 2.3 |
| 8 nm m | 7.0 | 1800 ± 200 | 1.8 |
| 8 nm d3 | 3.7 | 1300 ± 160 | 1.9 |
| 8 nm d4 | 2.6 | 1100 ± 120 | 1.9 |
| 8 nm d5 | 5.1 | 1530 ± 150 | 2.1 |
| 8 nm t1 | 31 | 3800 ± 410 | 1.6 |
| 8 nm t2 | 15 | 2700 ± 330 | 1.6 |
| 10 nm m | 12 | 2400 ± 300 | 2.5 |
| 10 nm t2 | 26 | 3500 ± 470 | 2.1 |

[a]Component nanoparticle diameters are given, m denotes monomer; d and t refer to dimer and trimer arrays.
[b]Relative HRS intensity per component nanoparticle.
[c]HRS depolarization ratio. Measurement uncertainties ranged from 0.05 to 0.12. $\epsilon_{820}$ is negligible.

To quantify the nonlinear behavior and facilitate benchmarking versus more familiar molecular chromophores, first hyperpolarizabilities also are provided. While the description of β for molecular scatterers is unambiguous, a direct comparison to β values for nanoparticles might not be appropriate since the latter can contain tens or even hundreds of thousands of atoms. For example, the largest of the trimers here contains ~90000 atoms; $β^{trimer}$ is ~1×10$^{-24}$ esu per component nanoparticle. A better comparison may be scattering efficiency per unit volume. Recognizing that the nonlinear scattering intensity scales as $β^2$, we suggest $β_{particle}^2$/atom (or $β_{molecule}^2$/atom) as an approximation to the desired volume-normalized quantity. Conventional first hyperpolarizability units can be retrieved by defining the normalized or "per atom" hyperpolarizability as $β' = (β_{particle}^2/\text{atom})^{1/2}$. Data is provided in this fashion (Table 1).

The observed β' values for the gold nanoparticles and, in particular, the trimeric particle assemblies, are as large or larger than those of the best molecular chromophores. The normalized hyperpolarizabilities in Galletto et al., Phys Chem. B, Vol. 103, 1999, p. 8706 for monomeric gold particles agree well with those found here once they are recast in terms of $β'(=[β^2/\text{atom}]^{1/2})$. The values reported in Johnson et al., J. Phys. Chem, Vol. 93, 1989, p. 7281 appear incorrectly described as β/atom; they are, in fact, β values.

In part, the extraordinary values for the particles appear to be a consequence of two photon resonance interactions with the colloids' intense plasmon band; the values may be smaller under conditions of preresonance with the plasmon absorption band. See, Antoine et al., Chem. Commun., 1997, p. 1901. The data in Antoine et al. indicate a precipitous drop in SHG efficiency as the second harmonic frequency is shifted away from resonance with the plasmon band. On the other hand, excitation profile studies of HRS from silver nanoparticles, reveal persistent nonlinear scattering (e.g., β'. 1000×10$^{-30}$ esu) under preresonance conditions.

In addition, the occurrence of quadrupolar scattering has been suggested as a partial explanation for the existence of nonzero HRS signals (from monomers), despite the particles' centrosymmetric crystal structure and near spherical shape. Returning to Table 1, it also appears that β' for the assemblies is particle size-dependent, increasing as the gold monomer diameter increases from 5 to 10 nm. For monomeric scatterers, the Agarwal-Jha theory (Solid State Commun., Vol. 41, 1982, p. 499) predicts an increase in total scattering power with the square of the number of atoms, or equivalently, a linear increase in β' with the number of atoms. Galetto et al. (Chem. Commun, 1999, p. 581) have also reported on the gold monomer particle size dependence of the HRS efficiency. If recast in terms of either I or β', the data indicate, consistent with the more limited study here, systematic increases with increasing number of atoms: I% (number of atoms)$^{1.5}$ or β'% (number of atoms)$^{0.75}$.

Table 1 also lists depolarization ratios, D (the ratio of vertically to horizontally polarized HRS, based on vertical incident polarization; see inset in FIG. 6). The ratios observed for trimers are consistently smaller than for monomers, dimers, or randomly assembled large aggregates. For molecular scatterers, D reports on the point-group symmetry of the scatterers. Without wishing to be bound to any theory of operation, while the physics may be different for scattering by metal nanoparticles versus molecules, here D may still be reporting on the symmetry of the scatterer. Candidate symmetry-related explanations for the differences in D and in I include enhanced quadrupolar scattering and the onset of an octupolar scattering mechanism. The latter would assume each trimer behaves as a single, unified chromophoric entity, even though the component particles are separated by ~2 nm. While difficult to envision for molecular chromophores, strong electromagnetic interactions over such distances are well established for metal nanoparticles. Further theoretical work may be envisioned.

Finally, the distance dependence of electromagnetic communication between particles in PA assemblies was analyzed within the context of their β' values (Table 1). For trimers, β' decreases with increasing interparticle distance. Again, available theory for linear spectroscopy indicates that interparticle electromagnetic interactions for free-electron metals in this size regime will decay as a complex function of distances with the interaction propagating farther for larger particles. In contrast to electronic communication between linked molecular chromophores, the strength of the interparticle electromagnetic interaction is expected to be insensitive to linkage ligand conjugation, orientation, HOMO energy, and LUMO energy, as well as chromophore/linkage chemical interaction, instead depending only on the dielectric properties of the linkage ligand and any other intervening material (for example, interstitial solvent). Note that a similar correlation between nonlinear scattering intensity and distance is lacking for the centrosymmetric gold dimers, suggesting that here the particles are largely behaving as individual, rather than collective, nonlinear scatterers.

Thus, the above-described hyper-Rayleigh scattering spectroscopy has measured collective nonlinear optical behaviors in gold nanoparticle arrays. Exceptionally large responses were observed. The findings appear to indicate that both symmetry and distance may be important in determining the nonlinear optical behaviors of nanoscale objects (free-electron metal particles) connected by molecular bridges. Second harmonic generators and generation methods thereby may be provided.

Figure 2A:
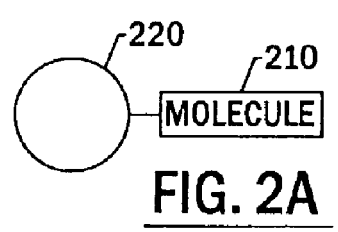
FIGS. 2A–2E are schematic diagrams of nanocircuits and molecule wiring methods according to some embodiments of the present invention.
Figure 2B:
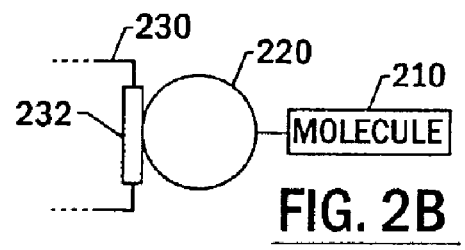

FIGS. 2A–2E are schematic diagrams of methods of wiring a molecule into an electric circuit, and nanocircuits including a nanomolecule, according to some embodiments of the present invention. In particular, referring to FIG. 2A, a metal nanoparticle 220 is attached to a molecule 210. In some embodiments of the invention, the molecule 210 is about 10 nm wide and the metal nanoparticle 220 is about 20 nm in diameter. In some embodiments, the metal nanoparticle 220 is attached to the molecule 210 by bonding (e.g., covalently bonding) the nanoparticle to the molecule through a thiol functionality, as was already described. Referring to FIG. 2B, the metal nanoparticle 220 is electrically connected to an electric circuit 230, for example a contact 232 or other portion of the electric circuit 230. Thus, the metal particle 220 can serve to bridge the gap between small molecules 210 and an electric circuit 230.

Figure 2C:
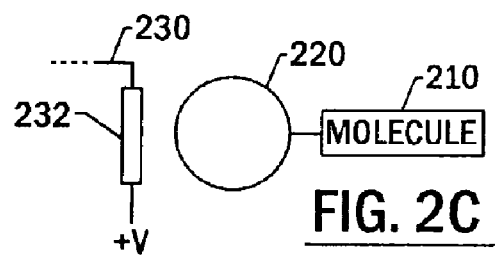
Figure 2D:
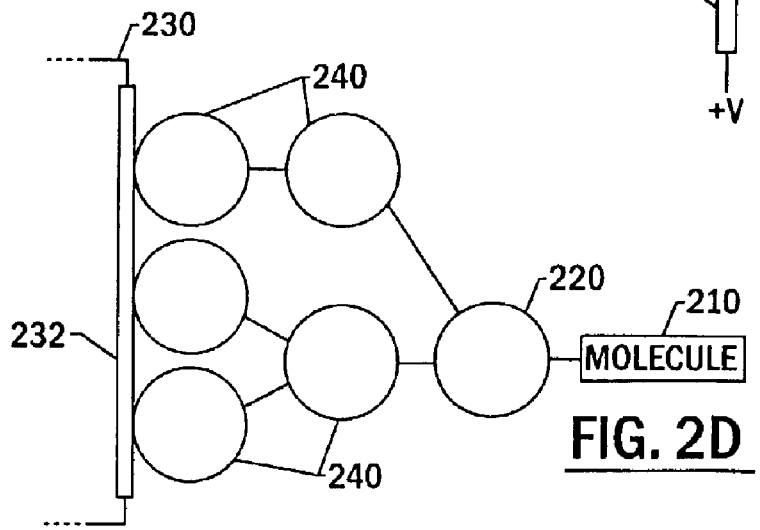
Figure 2E:
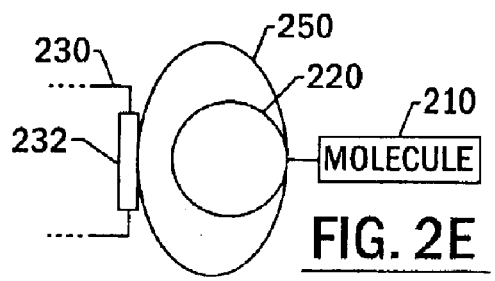

FIGS. 2C–2E illustrate embodiments for attaching a metal nanoparticle to a portion, such as a contact pad 232, of an electric circuit 230 according to other embodiments of the present invention. In particular, FIG. 2C illustrates electric field-induced assembly wherein a voltage, such as+V, is applied to the contact 232, to thereby attract the metal particle 220 thereto. In FIG. 2D, a plurality of second metal nanoparticles 240 are attached to the metal nanoparticle 220 using, for example, chemical assembly. In some embodiments, the metal particle 220 is functionalized with thiol by adding more thiol to the solution. At least some of the second metal particles 240 are attached to the contact 232. Thus, a large metal surface may be created which then may be attached to the contact 232 using conventional attachment techniques and/or the attachment technique of FIG. 2C. Finally, in FIG. 2E, the metal particle 220 is used as a seed to deposit metal 250 on the metal nanoparticle 220. Electrodeposition may be used. The metal 250 then may be attached to the electric circuit using conventional techniques and/or techniques of FIG. 2C.

Figure 3A:
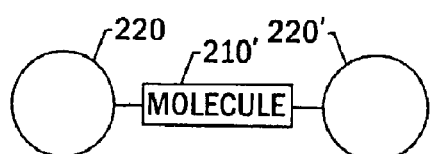
FIGS. 3A–3E are schematic diagrams of nanocircuits and molecule wiring methods according to other embodiments of the present invention.
Figure 3B:
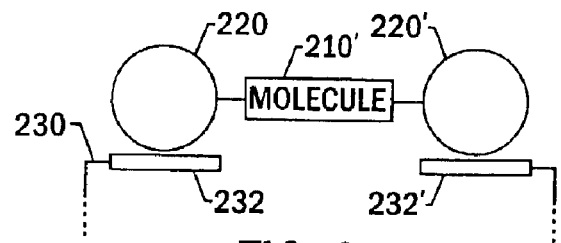
Figure 3C:
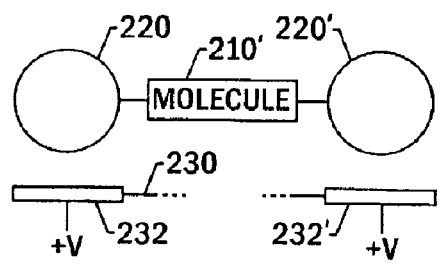
Figure 3D:
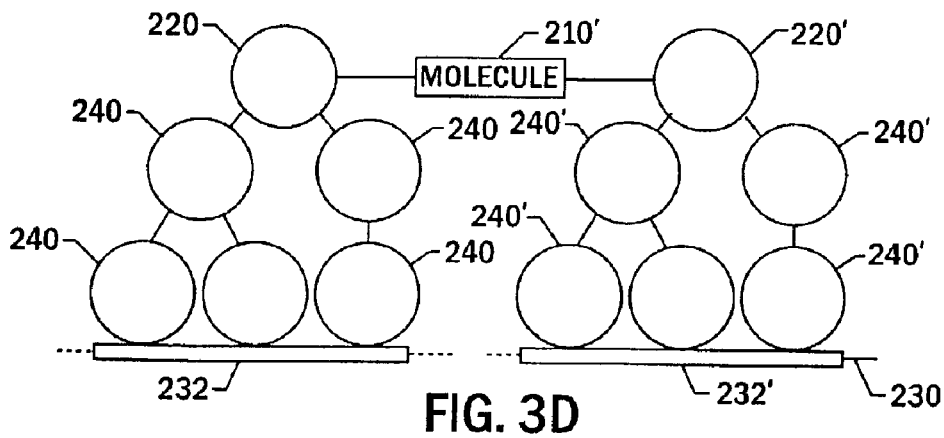
Figure 3E:
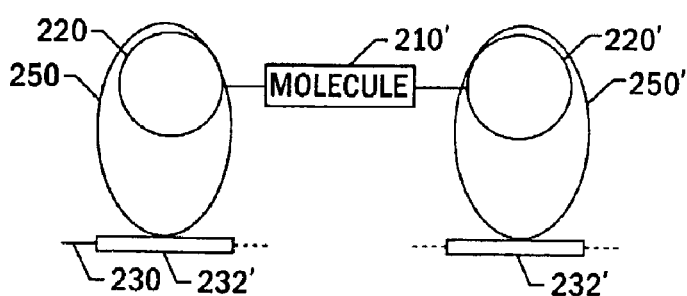

FIGS. 3A–3E illustrate methods and structures corresponding to FIGS. 2A–2E, respectively, except that two metal nanoparticles 220 and 220' spaced apart portions of a molecule 210' (FIG. 3A). As shown in FIGS. 3B–3E, a respective one of the two metal nanoparticles 220, 220' is connected to a respective one of two spaced apart portions 232, 232' of the electric circuit. Prime notation is used in FIGS. 3A–3E to signify replicated elements. Accordingly, embodiments of FIGS. 3A–3E may be used to create nanowires or other two terminal nanoelements for electric circuits.

Figure 4:
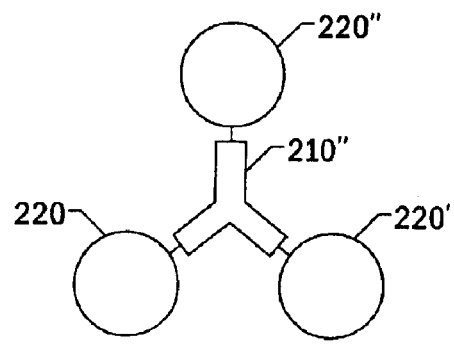
FIG. 4 is a schematic diagram of nanocircuits and molecule wiring methods according to still other embodiments of the present invention.

FIG. 4 illustrates other embodiments of the invention wherein three metal nanoparticles 220, 220', 220" are attached to spaced apart portions of a molecule 210". A respective one of the three metal nanoparticles 220, 220', 220" may then be connected to a respective one of three spaced apart portions of an electric circuit using techniques that were described in connection with FIGS. 2B–2E and/or 3B–3E. This description will not be repeated for the sake of brevity.

It will be understood that, in FIGS. 2A–2E, the molecule 210 may be a thiol-functionalized phenylacetelene monomer; in FIGS. 3A–3E, the molecule 210' may be a thiol-functionalized phenylacetelene dimer; and in FIG. 4, the molecule 210" may be a thiol-functionalized phenylacetelene trimer. In other embodiments, a tetrahedral molecule may be used with four nanoparticles. Molecules with more than four branches also may be used. Moreover, in some embodiments, one metal nanoparticle can be used to connect multiple molecules. Finally, in FIGS. 2A–2E, the unattached end of the molecule 210 may be connected to the circuit using conventional techniques, in some embodiments.

Additional discussion of embodiments of the present invention now will be provided. This discussion is taken from provisional Application Ser. No. 60/311,191 filed Aug. 9, 2001, and an article by Feldheim entitled Assembly of Metal Nanoparticle Arrays Using Molecular Bridges, The Electrochemical Society Interface, Fall 2001, pp. 22–25, the disclosures of both of which are hereby incorporated herein by reference in their entirety as if set forth fully herein.

A challenge in fabricating molecular electronic devices is establishing electrical contact to molecular device components. Some embodiments of the invention include new processes/structures for making these contacts. Prior to wiring up a desired molecular device, e.g., to a circuit on a silicon or other chip, metal particles (e.g., 20nm diameter gold, platinum and/or silver) are first attached to the molecule. The molecule-metal particle conjugate is subsequently wired up. The particle interconnects serve to bridge the gap between small molecules and electrical contacts on the chip.

Embodiments of the invention may represent a fundamentally new way of making electrical contacts to single molecules for molecular electronics. Using embodiments of the invention, wiring up single molecules for molecular electronic devices can be accomplished using standard photolithography techniques. Slow and expensive patterning techniques such as scanning probe and/or electron beam lithographies may not be needed with particle interconnects according to some embodiments of the invention. In other embodiments, these techniques also may be used.

More specifically, establishing electrical contacts to single molecules for molecular electronics may be difficult because molecules are small (for example, $\leq 10$ nm). Presently there may not be reliable and routine methods for patterning chips with metal contacts separated by these size scales. According to embodiments of the invention, a metal particle interconnect is first applied to the molecule of interest in solution, and then the molecule-particle conjugate is wired to the circuit on a chip. For example, a linear organic molecular wire on the order of 5 nm may not currently be wired up on a chip reliably because metal contacts spaced by 5 nm may not be fabricated reliably. However, if two 20 nm diameter gold particles are first attached to the two ends of the molecule, the total length of the molecule wire may be increased to 45 nm. Fabricating electrical contacts on a chip spaced by this distance can be much more routine.

Thus, embodiments of the invention can organize metal nanoparticles into symmetrically and spatially well-defined architectures. The impetus for embodiments of the invention may be at least two-fold, as will now be described.

First, metal nanoparticle aggregates can display rich optical behaviors that are distinctly different from a corresponding collection of individual particles or the extended solid. A range of fundamentally interesting new materials can thus be constructed from a single inorganic building block (e.g., gold and/or silver nanoparticles) by controlling such parameters as aggregate size, shape, and/or interparticle distance. Indeed, nanoparticle linear and nonlinear optical properties, hyperpolarizabilities, and electric field enhancement factors have been found to depend strongly on these parameters. In addition to generating significant fundamental interest, applications of nanoparticle-based materials appear to be emerging in which collective nanoparticle optical properties are exploited for calorimetric, surface-enhanced Raman (SERS), and/or surface plasmon resonance (SPR) bioassays. A number of home pregnancy and drug test kits based on the optical properties of gold nanoparticles are already available commercially.

A second theme that has emerged in nanoparticle research more recently pertains to their electrical characteristics. Individual 5 nm diameter particles have been wired up and shown to have properties useful in fabricating nanoscale analogues of traditional electronic device components such as transistors and tunnel diodes. See Feldheim et al., C.D. Chem. Soc. Rev., Vol. 27, 1998, p. 1. Less conventional forms of computing based on assemblies of nanoparticles have also been proposed. These schemes, coined Quantum Cellular Automata (QCA), rely on electrostatic coupling between square planar assemblies of metal dots. However, the implementation of QCA at room temperature may require dots smaller than 10 nm in diameter. Arranging such small structures into well-defined "integrated" systems may be difficult using conventional forms of lithography (e.g., photo, electron beam, scanning probe lithographies). Chemical self-assembly may become a tool for the realization of integrated nanoscale electronics. In this respect, metal nanoparticles are potentially powerful minimum device components because their surfaces can be modified using a number of well-developed and relatively routine chemical attachment strategies.

With these fundamentally interesting and technologically important goals in mind, embodiments of the invention can provide new protocols for assembling nanoparticles into covalently linked arrays. Gold and silver particles may be linked together to form relatively small aggregates-dimers, trimers, and tetramers-with well-defined symmetries and interparticle distances. With these structures in hand, the following questions may be addressed: (1) How do nanoparticles communicate electronically and electromagnetically as a function of interparticle distance, array symmetry, and/or bridge chemistry?; (2) How are the electronic properties of a molecular bridge perturbed by the surrounding nanoparticles?; and (3) Can molecules be chosen to act as "chemical gates" of electron transport between particles? As described below, according to embodiments of the invention, a variety of organic supermolecules may serve as "templates" for the formation of nanoparticle arrays.

Molecular bridges based on phenylacetylene units were chosen as a primary nanoparticle assembly tool because of their rigidity, and the relative ease with which they can be coupled together to form oligomers in a variety of symmetries and lengths. See FIG. 7. However, other primary nanoparticle assembly tools may be used.

Figure 7:
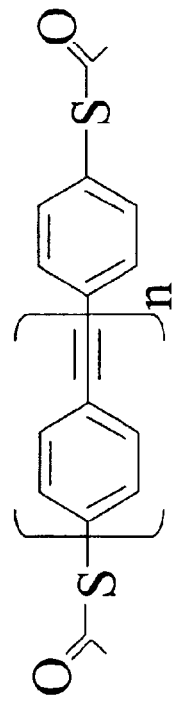
FIG. 7 schematically illustrates various embodiments of molecular bridges according to some embodiments of the present invention.
Figure 7:
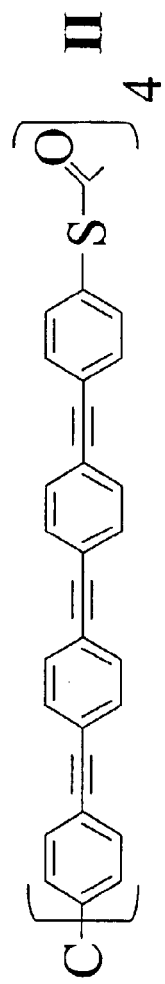
Figure 7:
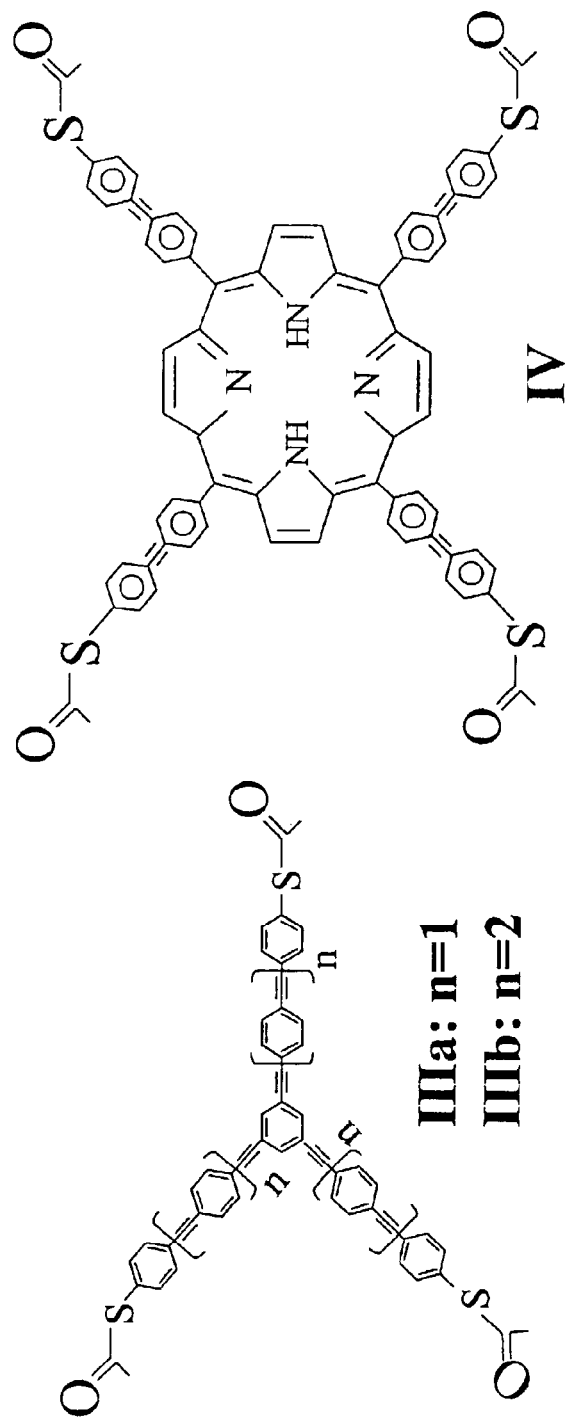
Figure 8:
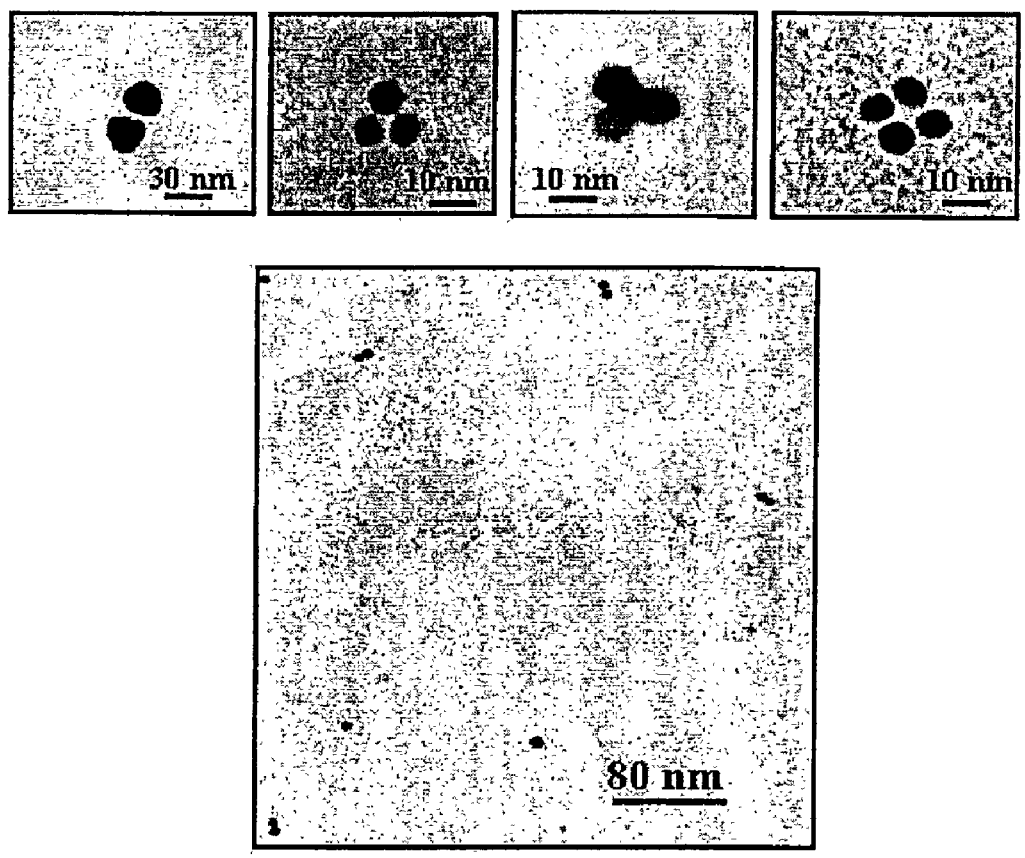
FIG. 8 illustrates Transmission Electron Micrographs (TEM) of gold nanoparticle arrays assembled using molecules (from top left to right: IC, IIIb, II, and IV) and an expanded view of gold nanoparticle dimers (bottom) according to some embodiments of the present invention.
Figure 9:
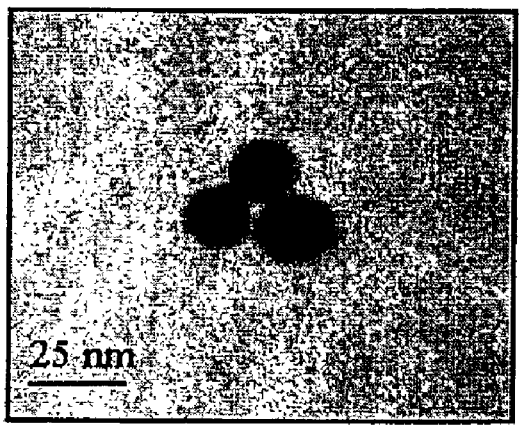
FIG. 9 illustrates TEM images of gold nanoparticle arrays assembled using molecules IIIA (left) and IIIB (right) according to some embodiments of the present invention.
Figure 9:
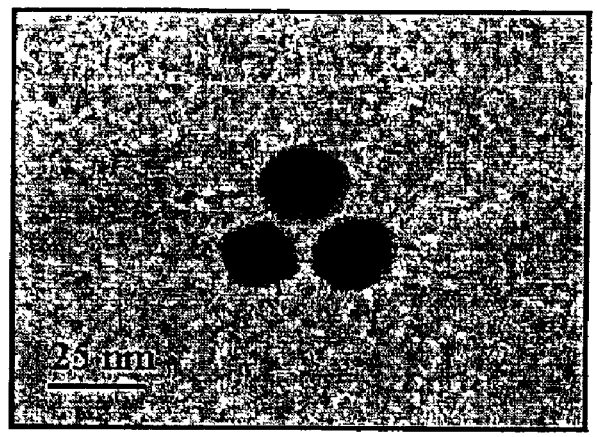

Referring to FIG. 7, when mixed slowly over time (for example 1 hr.) with a desired nanoparticle suspension, each thiol end group S (sulfur atom) binds to a single nanoparticle to form a nanoparticle array whose symmetry and interparticle distance may be dictated by the molecular bridge. Particle crosslinking and precipitation may be avoided by using an excess of nanoparticles relative to molecular bridge. FIG. 8 shows transmission electron micrographs (TEM) of gold nanoparticle arrays with $D_{\infty h}$, $D_{3h}$, $D_{4h}$, and $T_d$ symmetries. Note that the particles are not fused, but are separated by a distance which appears to be governed by the length of the phenylacetylene bridge. Increasing the arm lengths on the trithiol by one phenylacetylene unit, for example, increases the distance between particles, as shown in FIG. 9.

Figure 10A:
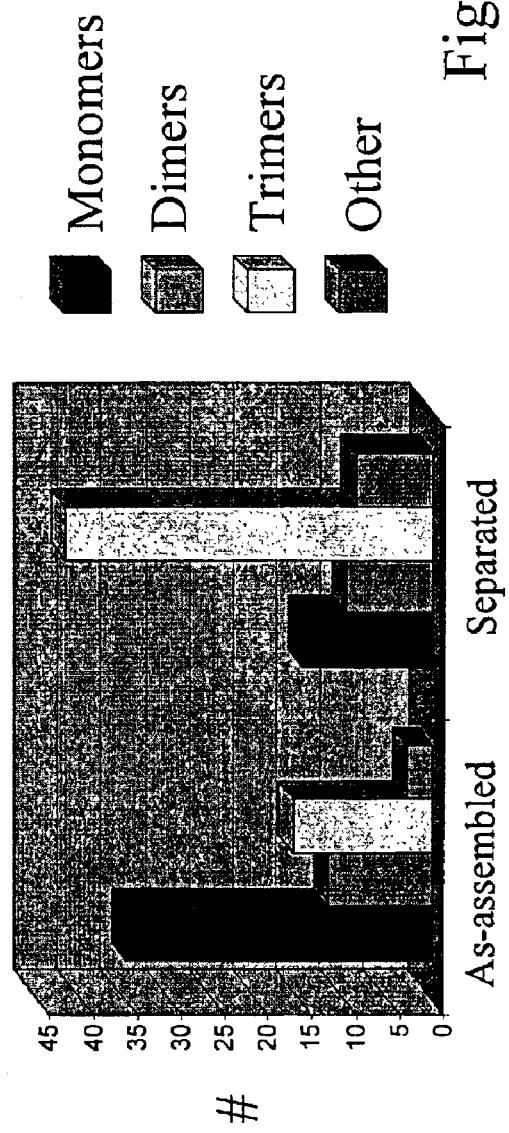
FIG. 10A is a histogram showing number of structures observed by TEM after array assembly and following centrifugation in 1 M sucrose according to some embodiments of the present invention.
Figure 10B:
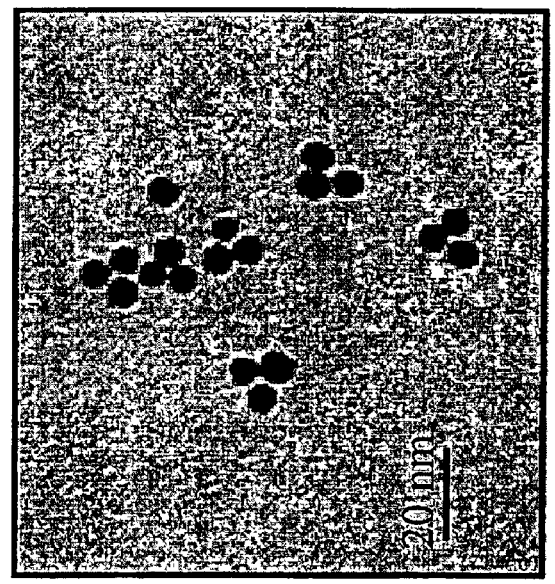
FIG. 10B is a TEM image of gold nanoparticle trimers following centrifugation according to some embodiments of the present invention.
Figure 11:
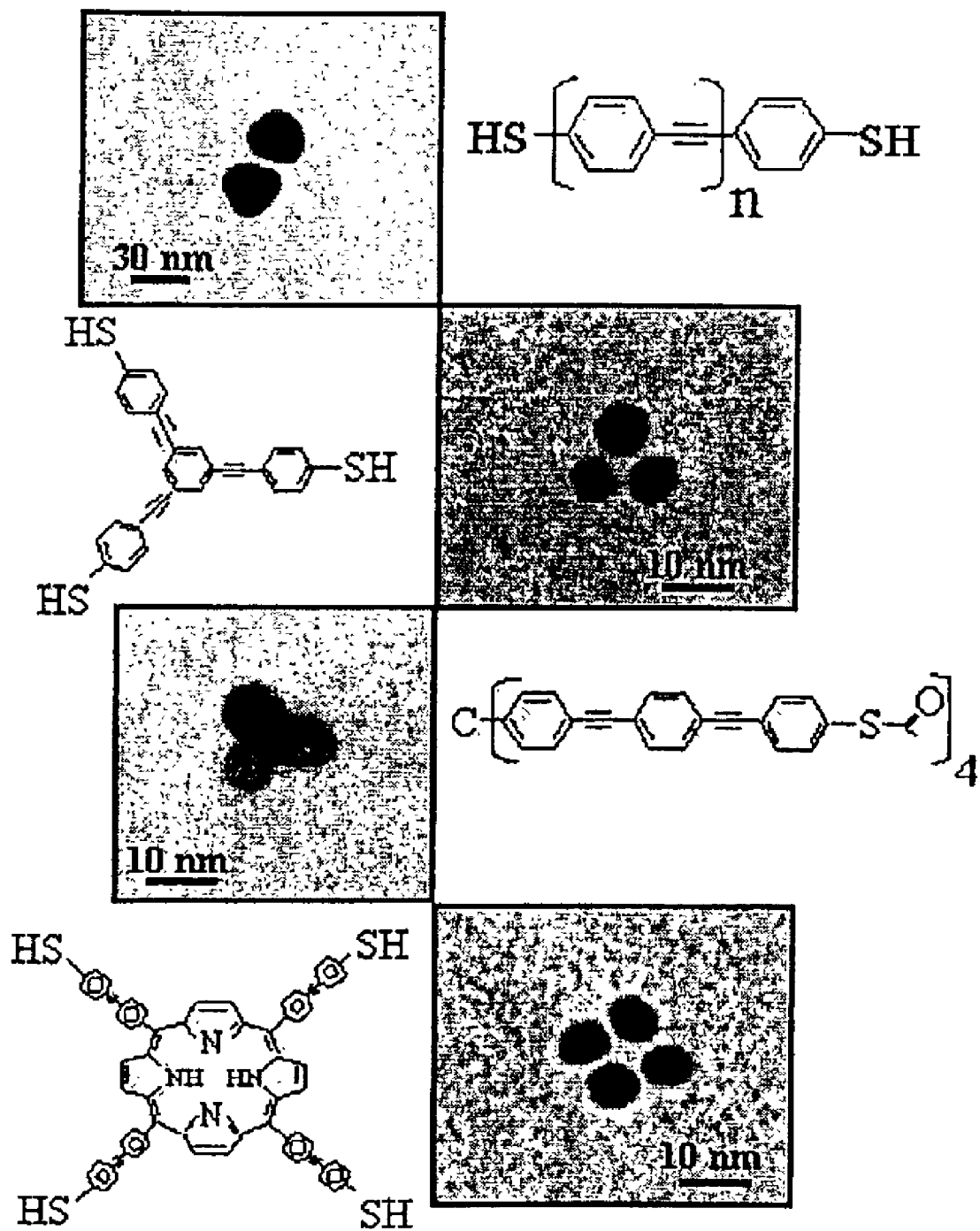
FIG. 11 illustrates TEM views of nanoparticle arrays that are associated with a linear dithiol, a trigonal trithiol, a tetrahedral tetrathiol and a square planar tetrathiol according to some embodiments of the present invention.

An expanded TEM view reveals that the presence of excess monomeric particles in the reaction mixture can prevent the formation of extended aggregates. See FIG. 8, bottom. Indeed, the desired geometry plus unreacted subunits of that structure may be found almost exclusively by TEM. For example, dithiols yield particle dimers and monomers, trithiols yield particle trimers, dimers, and monomers, etc. The histograms shown in FIG. 10A illustrate this observation. In general, yields from the as-synthesized reaction mixture range from, for example, about 30% –50% for the dimers and trimers, and, for example, about 10%–20% for the tetrahedra and square planar arrays. Enriched fractions of a particular array can be collected by, for example, ultracentrifugation in 1 M sucrose. FIG. 10B shows an image from a sample that has been purified to contain >60% of the trimer structure. FIG. 11 summarizes TEM views of nanoparticle arrays that are associated with a linear dithiol, a trigonal planar trithiol, a tetrahedral tetrathiol and a square planar tetrathiol.

Figure 12A:
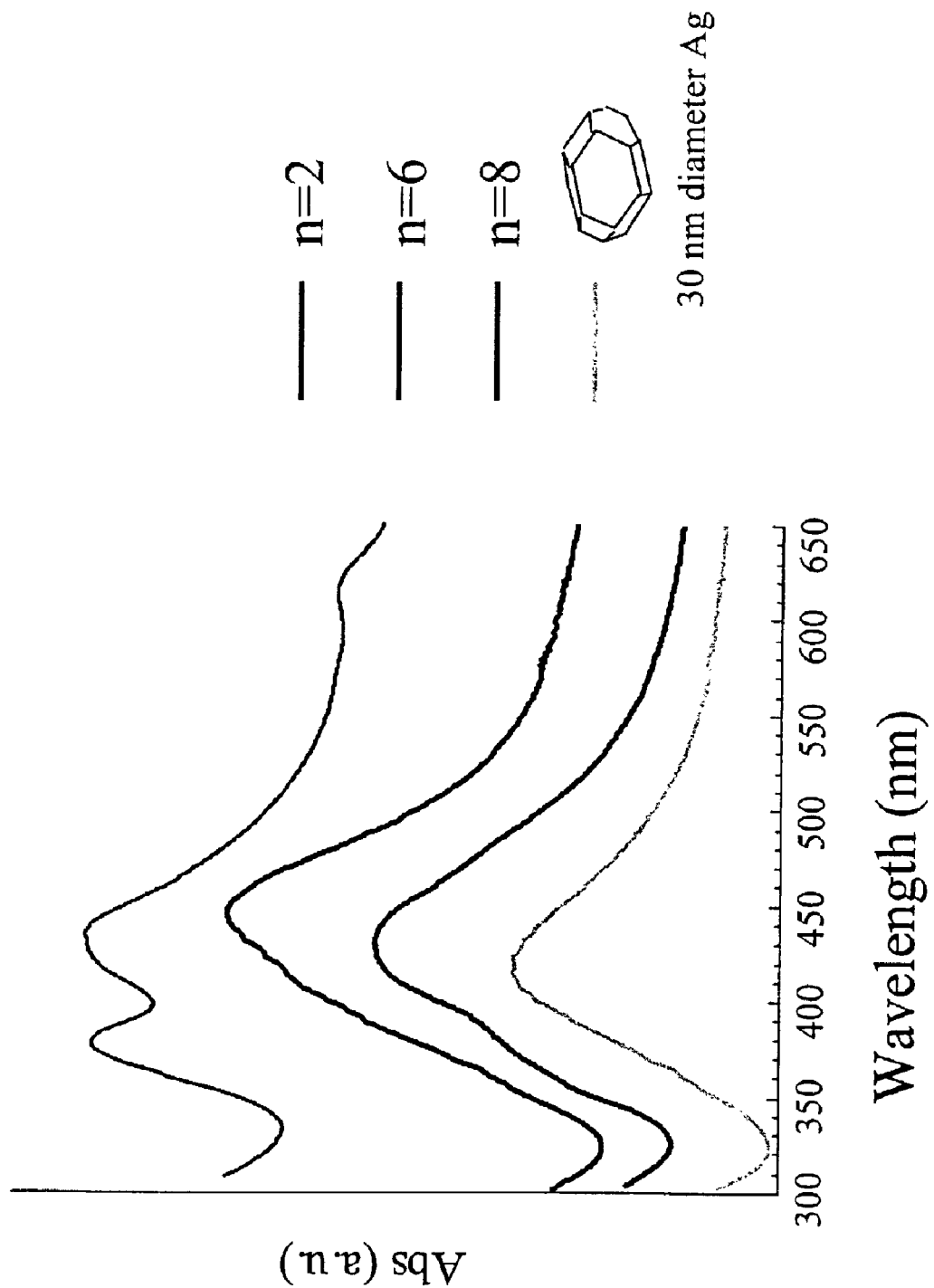
FIG. 12A graphically illustrates UV visible spectra of 30 nm diameter silver particles (bottom trace) and phenylacetelene-bridged dimers with n=8, 6 and 2 according to some embodiments of the present invention.

The molecularly bridged nanoparticle arrays described above have enabled the characterization of symmetry and distance dependent electromagnetic coupling between metal particles. As was described above, strong interparticle coupling was first demonstrated by UV-visible spectroscopy. FIG. 12A, for example, displays visible extinctions of two 30 nm diameter silver particles bridged by progressively shorter phenylethynyl dithiols. Solutions of unlinked silver particles contain a single extinction band centered at 420 nm corresponding to the well-known silver plasmon resonance band. Addition of a 9-unit phenylacetylene bridge caused a slight red shift and absorbance increase of the silver plasmon band. At separation distances corresponding to 7 phenylacetylene units, an extinction at 450 nm was observed with a more well-defined shoulder at 420 nm. Both bands were more intense than the single-particle plasmon band. Further reduction in separation to 3 phenylacetylene units caused no further shift in the low-energy extinction; however, the high-energy shoulder blue shifted to 370 nm and both bands grew in intensity. In addition, a relatively weak extinction was observed at about 600 nm.

Figure 12B:
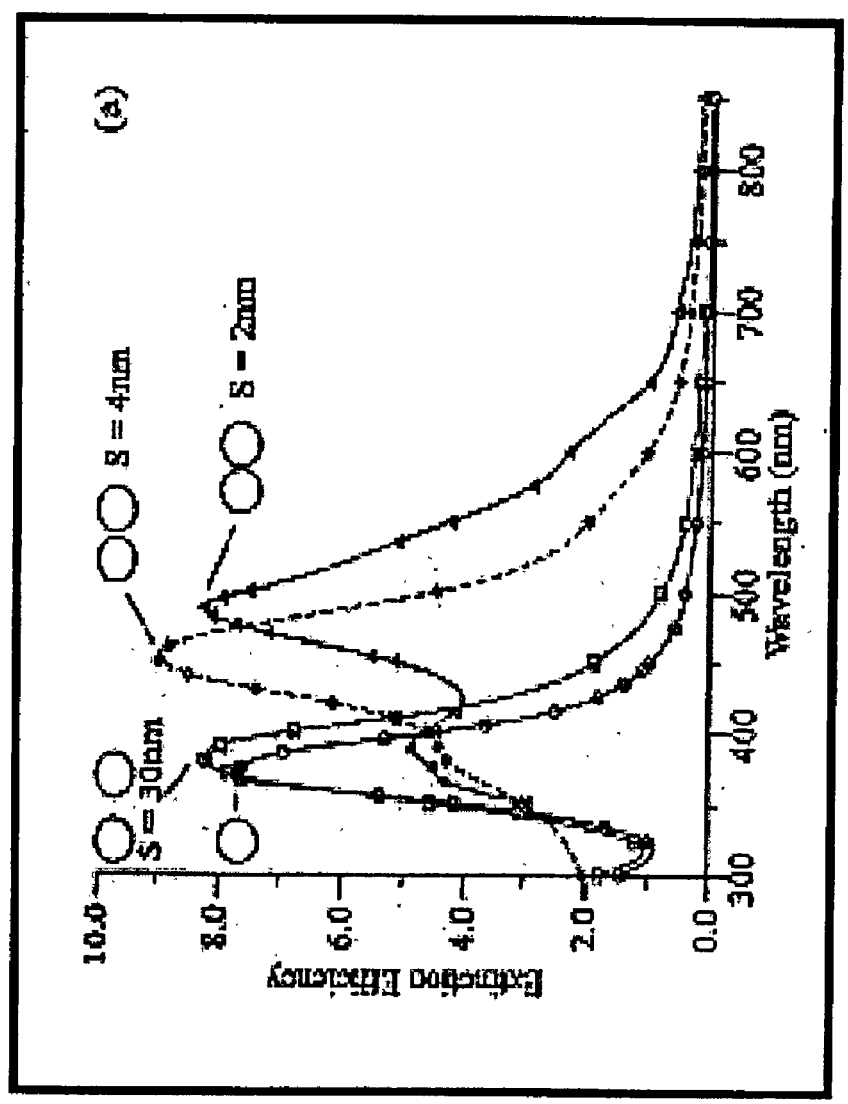
FIG. 12B graphically illustrates calculated silver particle spectra.

The visible spectra described above for gold and silver particle dimers are consistent with recent calculations using dipole approximations. See, Jenson et al., J. Cluster Sci., Vol. 10, 1999, p. 295. FIG. 12B presents spectra calculated for 60 nm diameter particle dimers as a function of particle separation distance. Note that, despite the size difference, the behaviors appear to be qualitatively in agreement; that is, both data sets reveal a red-shift of the single-particle plasmon band, an increase in overall extinction efficiency, growth of a high-energy shoulder (ca. 370 nm), and subsequent appearance of a band at 600 nm as interparticle distance decreases. The bands at 450 nm and 420 nm can be attributed to the longitudinal and transverse plasmon modes, respectively, of the dimer. The 420 nm band may also contain contributions from quadrupole moments. The feature at 600 nm is as yet unassigned. Disparities between experimental and calculated spectra may be due to particle size dispersity, the presence of excess monomers, and/or orientational averaging in solution not accounted for theoretically.

As was also described above, further information about electromagnetic coupling in metal nanoparticle arrays has been obtained with hyper-Rayleigh scattering spectroscopy (HRS). HRS measures incoherently scattered frequency doubled radiation from a sample of chromophores. HRS differs from other second harmonic techniques in that the frequency doubled light scales as the variance of the orientation with respect to the electromagnetic field. The variance generally is nonzero even for a randomly oriented sample. Consequently, HRS can be performed on solution suspensions without electric field or other poling techniques. Because HRS can effectively measure second harmonic generation, output signals would be expected to be enhanced for non-centrosymmetric nanoparticle trimer or tetrahedral arrays, compared to centrosymmetric monomers and dimers.

Figure 13:
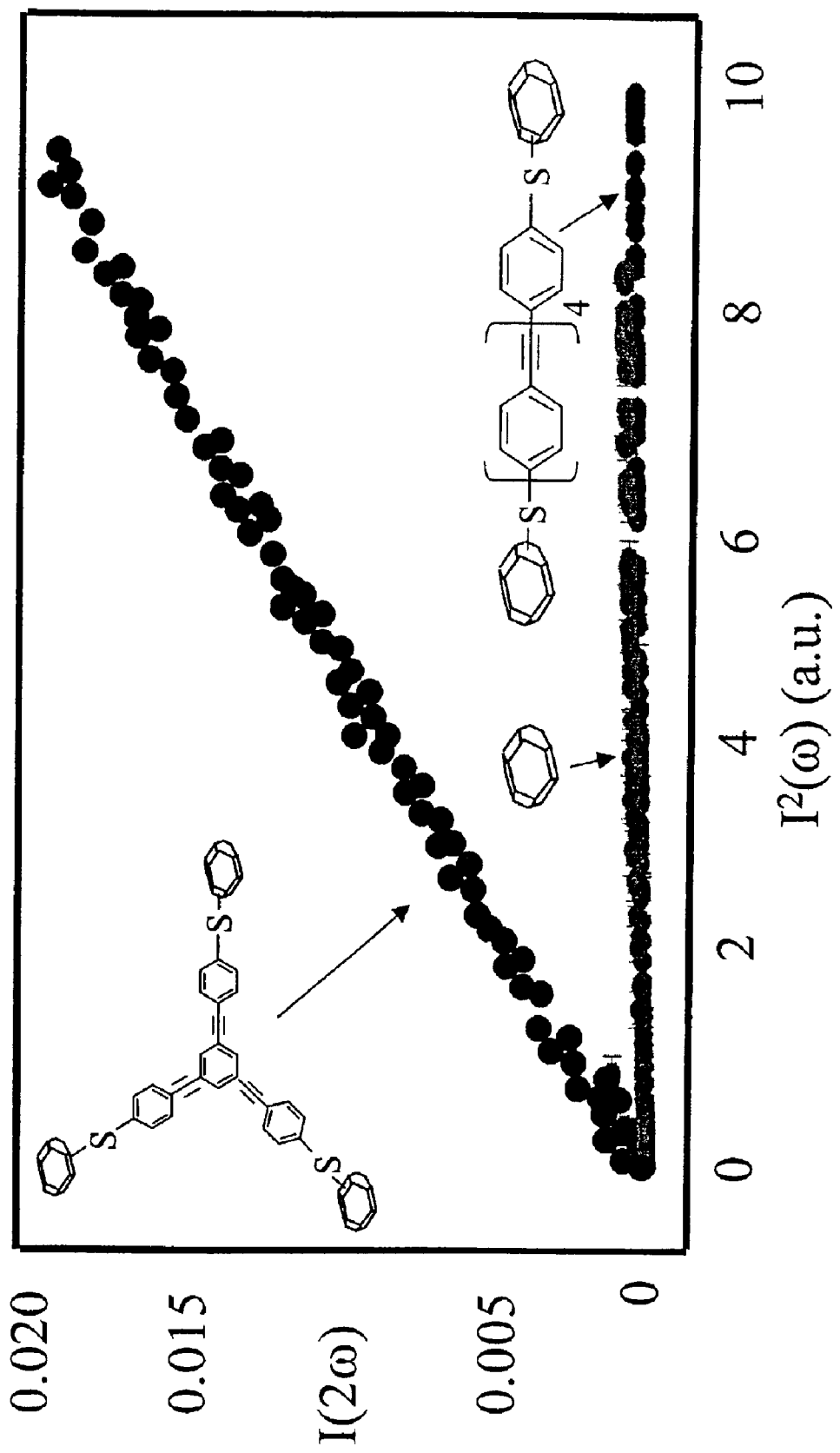
FIG. 13 graphically illustrates relative HRS intensity of 8 nm diameter gold particle trimers (IIIB), dimers (IB) and monomers according to some embodiments of the present invention.

FIG. 13 shows HRS intensities as a function of the square of the input power for 8 nm diameter gold monomers, dimers and trimers. Note that non-centrosymmetric gold trimers are relatively high nonlinear scatterers vs. centrosymmetric dimers and monomers. Insofar as the conventional molecular first hyperpolarizability ($\beta$) holds for these larger structures, $\beta$ can be used as a marker of electromagnetic communication between particles in an array. Table 2 reports $\beta^2$/atom as a function of interparticle symmetry and distance.

TABLE 2

| Particle Array; Molecular Bridge | $\beta^2$/atom ($10^{-3}$ esu) | Depolarization Ratio ($\beta v/\beta h$) |
| --- | --- | --- |
| Trimer; IIIA | 3800 ± 410 | 1.6 ± 0.07 |
| Trimer; IIIB | 2700 ± 330 | 1.6 ± 0.02 |
| Dimer; IA | 1300 ± 160 | 1.9 ± 0.2 |
| Dimer; IB | 1100 ± 120 | 1.9 ± 0.2 |
| Dimer; IC | 1530 ± 150 | 2.1 ± 0.1 |
| Monomer | 1800 ± 200 | 1.8 ± 0.04 |

The values reported, including those for the centrosymmetric monomers and dimers, appear to be as large or larger than the best molecular chromophores. Intense HRS from gold monomers is thought to result from higher-order moments. However, by arranging particles into the non-centrosymmetric trimer structure, HRS intensities up to 30 times those of the monomeric particles appear to be observable.

Also reported in Table 2 is the depolarization ratio, D, the ratio of vertically vs. horizontally polarized HRS. Within the context of molecular scatterers, D reports on the symmetry of the scatterers. Theoretically, D equals 2.0 for scatterers with the symmetries of the monomers and dimers, and 1.5 for the trimers. These values are in accord with those measured experimentally, a result which suggests that a majority of the nanoparticle arrays in solution exist in the geometries observed by TEM.

Finally, HRS can be a sensitive measure of the distance dependence of electromagnetic communication between particles in an array. For the two trimer assemblies measured to date, $\beta^2$/atom decreases with increasing interparticle separation distance (and thus decreasing electromagnetic communication). In contrast, no distance dependence appears to have been found for the dimer arrays, suggesting that particles are acting as individual, rather than collective scatterers.

Moreover, according to other embodiments of the invention that were described above, appropriately designed organic supermolecules can serve as useful templates for organizing nanoparticles into covalently bridged arrays. These "molecules of nanoparticles" can be used to test long-standing theories of dipole coupling and electric field enhancements between metal particles. A great deal of fundamental nanostructure physics may be uncovered in the future as workers in the field develop new methods for organizing particles into spatially complex arrangements.

Finally, as was also described above, according to other embodiments of the invention, molecularly bridged metal nanoparticle arrays may also serve as interconnects between single molecules and macroscopic electrical contacts. Establishing direct electrical connections between gold contacts and individual organic molecules may suffer from ambiguities associated with knowing the true identity of the molecule which has "assembled itself" between contacts, and the number, orientation, and/or contact chemistry of molecules in the gap.

Figure 14:
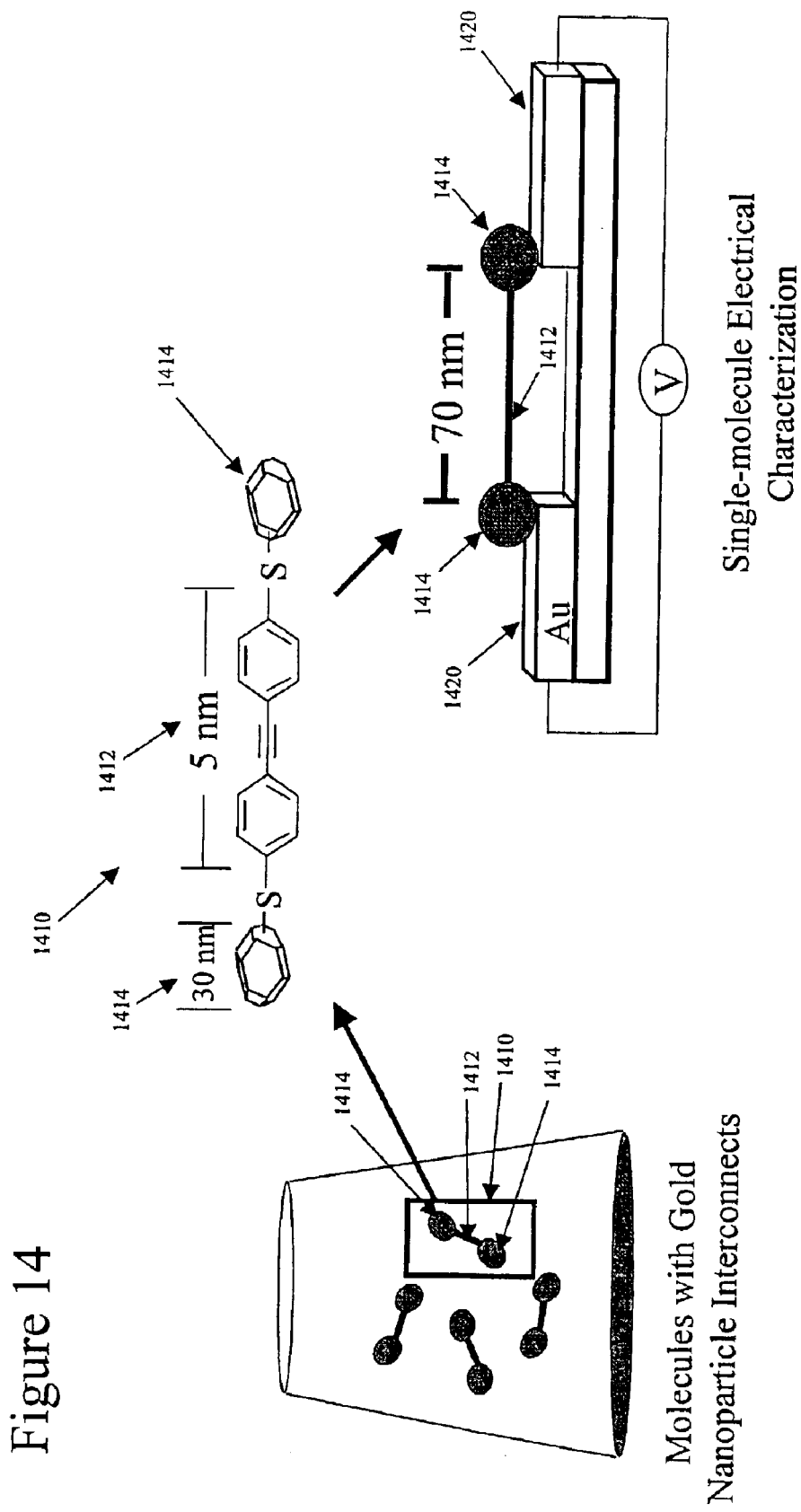
FIG. 14 schematically illustrates nanocircuits and molecule wiring methods according to some embodiments of the present invention.

The assembly of potential molecular electronic device candidates between metal nanoparticles allows one to characterize these parameters prior to electrical characterization, via solution phase spectroscopies. As shown in FIG. 14, an individual nanoparticle array 1410 comprising a molecule 1412 and at least two metal nanoparticles 1414 attached thereto could subsequently be assembled in the gap between macroscale contacts 1420 and the number of molecules in the gap inferred by locating their nanoparticle interconnects with TEM, SEM, or AFM-techniques that may not be usable on individual molecules themselves. Moreover, nanoparticle interconnects may also provide some relief from problems arising from fan out. Fabricating 2- or 3-terminal contacts separated by molecular length scales (e.g., sub10 nm) may be a daunting task for even electron beam lithography. However, a, for example, 5 nm-10 nm long molecule connected to two 30 nm diameter gold particles can push the minimum gap distance required to about 70 nm, a much more realistic fabrication dimension. These wiring techniques may be used to fabricate nano-wires or other two terminal nano-devices, nano-transistors or other three terminal nano-devices, molecular memory devices and/or other nanoscale electronic devices.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of wiring a molecule into an electric circuit comprising:
   attaching a metal nanoparticle to the molecule; and then
   electrically connecting the metal nanoparticle that is attached to the molecule, to the electric circuit.

2. A method according to claim 1 wherein the attaching comprises:
   bonding the nanoparticle to the molecule through a thiol functionality.

3. A method according to claim 1 wherein the electric circuit includes a contact and wherein the electrically connecting comprises:
   applying a voltage to the contact to attach the metal nanoparticle to the contact.

4. A method according to claim 1 wherein the electrically connecting comprises:
   depositing metal on the metal nanoparticle; and
   attaching the metal to the electric circuit.

5. A method according to claim 1:
   wherein the attaching comprises attaching two metal nanoparticles to spaced apart portions of the molecule; and
   wherein the electrically connecting comprises electrically connecting a respective one of the two metal nanoparticles to a respective one of two spaced apart portions of the electric circuit.

6. A method according to claim 5 wherein the two spaced apart portions are two spaced apart contacts.

7. A method according to claim 1:
wherein the attaching comprises attaching more than two metal nanoparticles to spaced apart portions of the molecule; and
wherein the electrically connecting comprises electrically connecting a respective one of the more than two metal nanoparticles to a respective one of more than two spaced apart portions of the electric circuit.

8. A method according to claim 7 wherein the more than two spaced apart portions are more than two spaced apart contacts.

9. A method according to claim 1 wherein the molecule is about 10 nm wide and wherein the metal nanoparticle is about 20 nm in diameter.

10. A method according to claim 1 wherein the molecule is a single molecule.

11. A method of wiring a molecule into an electric circuit comprising:
attaching a first metal nanoparticle to the molecule; then
attaching a plurality of second metal nanoparticle to the first metal nanoparticle; and then
attaching at least some of the second metal nanoparticle to the electric circuit.

12. A method according to claim 11 wherein the attaching a first metal nanoparticle to the molecule comprises:
bonding the nanoparticle to the molecule through a thiol functionality.

13. A method according to claim 11 wherein the electric circuit includes a contact and wherein the attaching at least some of the second metal nanoparticle to the electric circuit comprises:
applying a voltage to the contact to attach the at least some of the second metal nanoparticle to the contact.

14. A method according to claim 11 wherein the attaching at least some of the second metal nanoparticles to the electric circuit comprises:
depositing metal on the at least some of the second metal nanoparticles; and
attaching the metal to the electric circuit.

15. A method according to claim 11:
wherein the attaching a first metal nanoparticle to the molecule comprises attaching two first metal nanoparticles to spaced apart portions of the molecule;
wherein the attaching a plurality of second metal nanoparticles comprises attaching a group of second metal nanoparticles to each of the two first metal nanoparticles; and
wherein the attaching at least some of the second metal nanoparticles to the electrical circuit comprises attaching a respective group of second metal nanoparticles to a respective one of the two spaced apart portions of the electric circuit.

16. A method according to claim 15 wherein the two spaced apart portions are two spaced apart contacts.

17. A method according to claim 11:
wherein the attaching a first metal nanoparticle to the molecule comprises attaching three first metal nanoparticles to three spaced apart portions of the molecule;
wherein attaching a plurality of second metal nanoparticles comprises attaching a group of second metal nanoparticles to each of the three first metal nanoparticles; and
wherein the attaching at least some of the second metal nanoparticles to the electrical circuit comprises attaching a respective group of second metal nanoparticles to a respective one of the three spaced apart portions of the electric circuit.

18. A method according to claim 17 wherein the three spaced apart portions are three spaced apart contacts.

19. A method according to claim 11 wherein the molecule is about 10 nm wide and wherein the first and plurality of second metal nanoparticles are about 20 nm in diameter.

20. A method according to claim 11 wherein the molecule is a single molecule.

21. A nanocircuit comprising:
a single molecule;
an electric circuit; and
a plurality of metal nanoparticles that electrically connect the single molecule to the electric circuit.

22. A nanocircuit according to claim 21:
wherein the plurality of metal nanoparticles comprise two metal nanoparticles at spaced apart portion of the single molecule; and
wherein the electric circuit includes two spaced apart portion, a respective one of the two metal nanoparticles being electrically connected to a respective one of the two spaced apart portions.

23. A nanocircuit according to claim 22 wherein the two spaced apart portions are two spaced apart contacts.

24. A nanocircuit according to claim 21:
wherein the plurality of metal nanoparticles comprises three metal nanoparticles at spaced apart portions of the molecule; and
wherein the electric circuit includes three spaced apart portions, a respective one of the three metal nanoparticles being electrically connected to a respective one of the three spaced apart portions.

25. A nanocircuit according to claim 24 wherein the three spaced apart portions are three spaced apart contacts.

26. A nanocircuit according to claim 21 wherein the single molecule comprises a thiol-functionalized phenylacetelene molecule.

27. A nanocircuit according to claim 26 wherein the plurality of metal nanoparticles comprise a plurality of gold and/or silver nanoparticles.

28. A nanocircuit according to claim 21 wherein the single molecule is about 10 nm wide and wherein the plurality of metal nanoparticles are about 20 nm in diameter.

* * * * *

UNITED STATES PATENT AND TRADEMARK OFFICE
CERTIFICATE OF CORRECTION

PATENT NO. : 6,888,665 B2
DATED : May 3, 2005
INVENTOR(S) : Feldheim et al.

It is certified that error appears in the above-identified patent and that said Letters Patent is hereby corrected as shown below:

<u>Title page, Item [54] and Column 1, lines 1-3,</u>
Title, should read -- ELECTRONIC DEVICES AND METHODS USING MOLECULARLY-BRIDGED METAL NANOPARTICLES --.

<u>Column 15,</u>
Line 28, should read -- bonding the first metal nanoparticle to the molecule through a thiol --.

<u>Column 16,</u>
Line 29, should read -- metal nanoparticles at spaced apart portions of the single --.
Line 32, should read -- portions, a respective one of the two metal nanoparticles --.

Signed and Sealed this

Sixth Day of September, 2005

JON W. DUDAS
*Director of the United States Patent and Trademark Office*